(12) United States Patent
Gault et al.

(10) Patent No.: US 8,194,604 B2
(45) Date of Patent: Jun. 5, 2012

(54) WIRELESS LOCAL AREA NETWORK

(75) Inventors: Sophie Gault, Paris (FR); Roberta Fracchia, Paris (FR)

(73) Assignee: Motorola Mobility, Inc., Libertyville, IL (US)

( * ) Notice: Subject to any disclaimer, the term of this patent is extended or adjusted under 35 U.S.C. 154(b) by 382 days.

(21) Appl. No.: 12/542,056

(22) Filed: Aug. 17, 2009

(65) Prior Publication Data

US 2010/0061334 A1   Mar. 11, 2010

Related U.S. Application Data

(60) Provisional application No. 61/095,221, filed on Sep. 8, 2008.

(51) Int. Cl.
*H04W 88/10* (2009.01)
*H04W 74/08* (2009.01)
*H04W 28/08* (2009.01)
*H04W 72/04* (2009.01)

(52) U.S. Cl. ......... 370/330; 370/347; 370/445; 370/312

(58) Field of Classification Search .................. 370/328, 370/329, 330, 338, 347, 436, 437, 445, 465, 370/312
See application file for complete search history.

(56) References Cited

U.S. PATENT DOCUMENTS

| 7,706,816 | B2 * | 4/2010 | Jang et al. ..................... 455/458 |
| 7,961,752 | B2 * | 6/2011 | Parkvall et al. ............... 370/445 |
| 2007/0147423 | A1 | 6/2007 | Wentink |
| 2007/0159982 | A1 | 7/2007 | Singh et al. |
| 2007/0161364 | A1 | 7/2007 | Surineni et al. |
| 2007/0171858 | A1 * | 7/2007 | Grandhi et al. ............... 370/328 |
| 2007/0297351 | A1 * | 12/2007 | Trainin ......................... 370/260 |
| 2008/0165709 | A1 * | 7/2008 | Soliman ........................ 370/280 |
| 2009/0310618 | A1 * | 12/2009 | Carter ........................... 370/449 |
| 2009/0310692 | A1 * | 12/2009 | Kafle et al. .................... 375/260 |
| 2010/0014448 | A1 * | 1/2010 | Wentink et al. ............... 370/311 |
| 2010/0046485 | A1 * | 2/2010 | Merlin et al. ................. 370/338 |

FOREIGN PATENT DOCUMENTS

| EP | 784387 A2 * | 7/1997 |
| WO | WO2007046618 A1 | 4/2007 |
| WO | WO2007046619 A1 | 4/2007 |
| WO | WO2007046620 A1 | 4/2007 |

OTHER PUBLICATIONS

Fracchia, et al., OFDMA-PSMP, Standards Contribution to IEEE 802.11-07, IEEE Sep. 2008, 8 pages.

* cited by examiner

*Primary Examiner* — Chi Pham
*Assistant Examiner* — Ahmed Elallam

(57) ABSTRACT

A wireless local area network comprising an access point and a plurality of remote stations arranged to communicate using Orthogonal Frequency Division Multiplex (OFDM). The system can operate in a first access mode wherein access to the access point is in accordance with a Carrier Sense Multiple Access (CSMA) scheme and in a temporary second access mode wherein access to the access point is in accordance with a Time Division Multiple Access (TDMA) scheme. A resource allocation of resource blocks when in the TDMA mode is furthermore such that resource blocks may be allocated to a plurality of remote stations which have overlapping time intervals and disjoint sets of OFDM subcarriers thereby allowing simultaneous communication for the plurality of remote stations within the overlapping time interval. The access operation is controlled by a single message transmitted from the access point. The invention may in particular be suitable for IEEE 802.11 systems.

20 Claims, 7 Drawing Sheets

WIRELESS LOCAL AREA NETWORK

FIELD OF THE INVENTION

The invention relates to a wireless local area network and in particular, but not exclusively, to an Institute of Electrical and Electronic Engineers (IEEE) 802.11n wireless communication system.

BACKGROUND OF THE INVENTION

In recent years, wireless data communication in domestic and enterprise environments have become increasingly commonplace and an increasing number of wireless communication systems have been designed and deployed. In particular, the use of wireless networking has become prevalent and Wireless Local Area Network (WLAN) standards have been developed.

The Institute of Electrical and Electronic Engineers (IEEE) have formed a committee for standardizing WLANs such as e.g. the popular IEEE 802.11 standard series. The IEEE 802.11 series comprises a number of standards for different WLANs, including the IEEE 801.11a™ and IEEE 801.11g™ standards which have become commonplace. Furthermore, the IEEE has continued to further develop and standardize different WLAN systems including a high-speed WLAN standard known as IEEE 802.11n. IEEE 802.11n™ systems are expected to operate in the 5 GHz frequency spectrum and promises data rates of around 100 Mbps and above. 802.11n™ will use many techniques which are similar to the earlier developed IEEE 801.11a™ and IEEE 801.11g™ standards and is to a large extent compatible with many of the characteristics of the earlier standards thereby allowing reuse of techniques and circuitry developed for these. For example, as in the previous standards IEEE 801.11a™ and IEEE 801.11g™, 802.11n™ will use Orthogonal Frequency Division Multiplex (OFDM) modulation for transmission over the air interface. Furthermore, IEEE has begun the initial work on the standardization of a further enhancement known as IEEE 802.11VHT™ (for Very High Throughput).

It is thus a continued desire that further WLAN techniques and standards are developed which may provide improved performance and which in particular may provide improved throughout, increased flexibility, and/or improved air interface resource management and allocation.

SUMMARY OF THE INVENTION

Accordingly, the Invention seeks to preferably mitigate, alleviate or eliminate one or more of the above mentioned disadvantages singly or in any combination.

According to a first aspect of the invention, there is provided a wireless local area network comprising an access point and a plurality of remote stations arranged to communicate using Orthogonal Frequency Division Multiplex, OFDM; wherein the access point is capable of operating in a first access mode wherein access to the access point is in accordance with a Carrier Sense Multiple Access, CSMA, scheme and in a second access mode wherein access to the access point is in accordance with a Time Division Multiple Access, TDMA, scheme; and the access point comprises: a resource allocator for allocating resource blocks to the remote stations when the access point operates in the second access mode, a resource block for a remote station comprising an allocated time interval and an allocated set of OFDM subcarriers; a mode controller for temporarily switching the access point from the first access mode to the second access mode of operation for a time interval; a transmit unit for broadcasting at least a first message indicating that the access point switches from the first access mode to the second access mode for the time interval; the first message comprising resource information specifying resource blocks allocated to the plurality of remote stations; and wherein each of the remote stations is capable of operating in a CSMA mode of operation wherein the remote station is arranged to autonomously access the access point if no collision is detected and to operate in a TDMA mode of operation wherein the remote station is arranged to communicate only using resource allocated to the remote station by the resource allocator; and each remote station comprises: a monitor processor for monitoring for the first message, mode switch means for switching the remote station from the CSMA mode to the TDMA mode for at least the time interval in response to a detection of the first message, a resource controller for decoding the first message to identify an allocated resource block being allocated to the remote station by the resource allocator, and a communication unit for communicating with the access point using a set of allocated time intervals and a set of allocated OFDM subcarriers of the allocated resource block; wherein the resource allocator is arranged to allocate resource blocks having overlapping time intervals and disjoint sets of OFDM subcarriers to a plurality of remote stations allowing simultaneous communication for the plurality of remote stations within the overlapping time interval.

The invention may allow improved performance of a wireless local area network. In particular, the invention may allow sharing of air interface resource between remote stations using a combination of different multiple access schemes arranged to effectively cooperate with each other to provide flexible and efficient resource usage and management. Furthermore, the complexity of managing a WLAN utilizing a number of different access techniques may be reduced.

The invention may allow an improved throughput in many scenarios and may allow a more efficient air interface resource management resulting in an increased capacity of the system as a whole. The invention may allow the air interface resource to be managed in accordance with a number of cooperating and interacting access schemes without resulting in a substantial complexity increase for either the remote stations or the access point. In particular, the co-existence of the different access schemes is achieved while maintaining a low air interface signaling overhead.

The invention may allow the air interface resource sharing approach to be efficiently and flexibly adapted to the conditions currently experienced in the wireless local area network. In particular, the invention may allow a wireless local area network to use both distributed resource allocation and centralized resource allocation depending on the current conditions.

The invention allows improved resource allocation with increased flexibility. In particular, the system allows simultaneous communication within an OFDM channel for a plurality of users while still effectively supporting a CSMA scheme.

Each resource block may e.g. allocate an uplink resource, a downlink resource or both an uplink and downlink resource. The transmission of the first message may be asynchronous. Specifically the first message may be transmitted at any suitable time and is not restricted to any specific pattern, repetition rate or transmission time. Specifically, the first message may be transmitted at any given time the mode controller determines that current operational characteristics meet a criterion for switching the access point from the first access mode to the second access mode.

According to another aspect of the invention, there is provided a method of operation for a wireless local area network comprising an access point and a plurality of remote stations arranged to communicate using Orthogonal Frequency Division Multiplex, OFDM, wherein the access point is capable of operating in a first access mode wherein access to the access point is in accordance with a Carrier Sense Multiple Access, CSMA, scheme and in a second access mode wherein access to the access point is in accordance with a Time Division Multiple Access, TDMA, scheme; and each of the remote stations is capable of operating in a CSMA mode of operation wherein the remote station is arranged to autonomously access the access point if no collision is detected and to operate in a TDMA mode of operation wherein the remote station is arranged to communicate only using resource allocated to the remote station by the resource allocator; the method comprises the access point performing the steps of: allocating resource blocks to the remote stations when the access point operates in the second access mode, a resource block for a remote station comprising an allocated time interval and an allocated set of OFDM subcarriers, temporarily switching the access point from the first access mode to the second access mode of operation for a time interval, broadcasting at least a first message indicating that the access point switches from the first access mode to the second access mode, the first message comprising a resource information specifying resource blocks allocated to the plurality of remote stations; and each remote station performing the steps of: monitoring for the first message, switching the remote station from the CSMA mode to the TDMA mode in response to a detection of the first message, decoding the first message to identify an allocated resource block being allocated to the remote station by the resource allocator, and communicating with the access point using a set of allocated time intervals and a set of allocated OFDM subcarriers of the allocated resource block; wherein the allocation of resource blocks includes allocating resource blocks having overlapping time intervals and disjoint sets of OFDM subcarriers to a plurality of remote stations allowing simultaneous communication for the plurality of remote stations within the overlapping time interval.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to an IEEE 802.11 (and in particular IEEE 802.11n) wireless local area network modified as set out below. However, it will be appreciated that the invention is not limited to this application.

Figure 1:
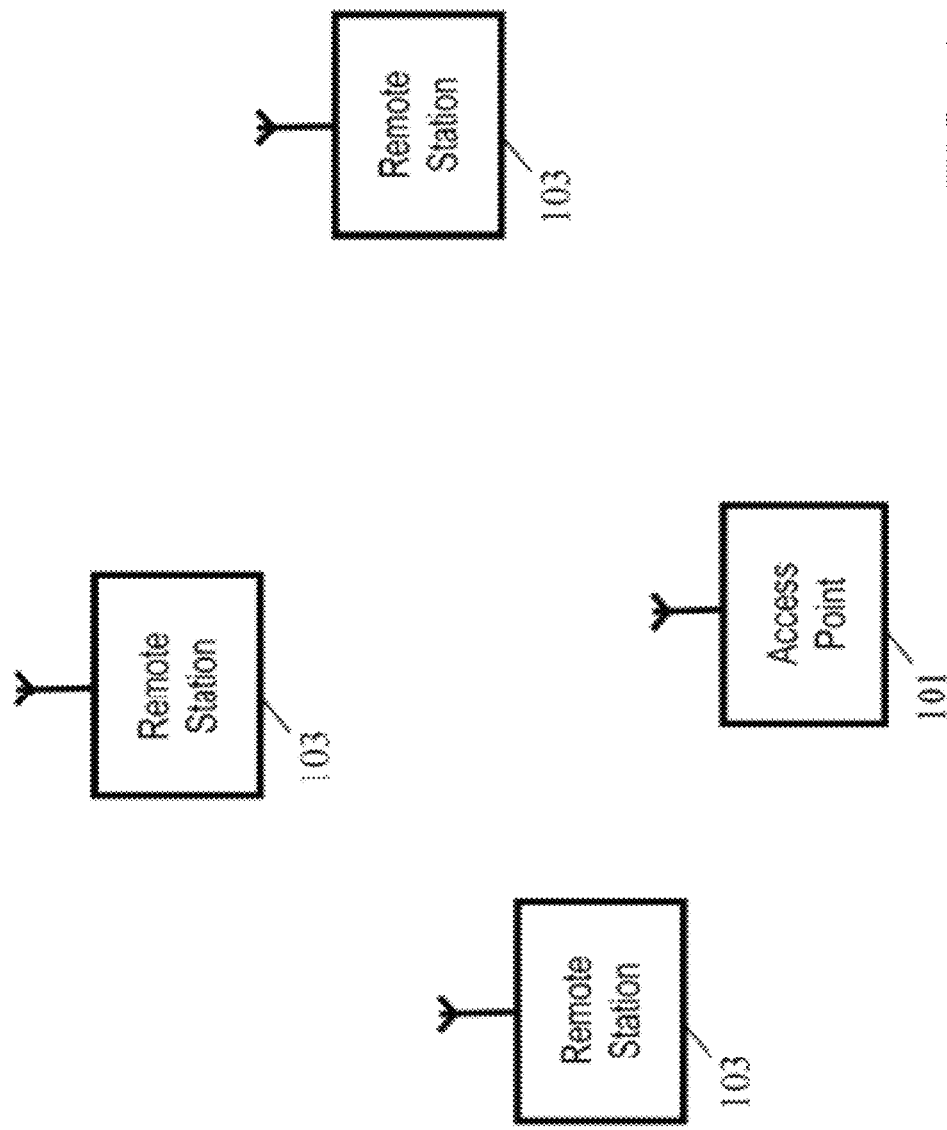
FIG. 1 is an illustration of some elements of a wireless local area network in accordance with some embodiments of the invention.

FIG. 1 illustrates some elements of an IEEE 802.11n wireless local area network. For brevity and clarity, FIG. 1 illustrates only a single access point 101 supporting a plurality of remote stations 103 (often referred to as "stations" or "STA" for IEEE 802.11). The wireless local area network of FIG. 1 may specifically be an IEEE 802.11n network which has been enhanced as will be described in the following.

In IEEE 802.11 systems, the remote stations 103 communicate with the access point 101 using Orthogonal Frequency Division Multiplex (OFDM) modulation. Thus, in a traditional IEEE802.11 system, each channel carries a series of OFDM symbols from the remote station currently accessing the access point 101 each OFDM symbol comprises a number of OFDM subcarriers each of which carry a single data symbol at a time. Thus, the OFDM symbol comprises a plurality of parallel data symbols.

Traditional IEEE 802.11 networks use a Carrier Sense Multiple Access (CSMA) scheme to control access to the access point. CSMA is a contention-based protocol, i.e. any remote station senses the medium (the air interface channel) before transmitting to determine that it is available. More precisely, if the medium is sensed idle for a time interval (known as DIFS), the station wins the right to transmit. In all cases, the remote stations continuously monitor the medium for possible information. For any received packet, remote stations that are not the destination of the packet set their Network Allocation Vector (NAV) to interrupt their monitoring activity for the duration of the transmission indicated in the packet header.

However, although CSMA is highly suitable for some systems and in some scenarios, it also has disadvantages and specifically may result in inefficient or inflexible resource usage. However, these disadvantages are mitigated in the system of FIG. 1. In particular, the inventors have realized that improved performance can be achieved by introducing simultaneous multi-user support in each OFDM channel for systems such as IEEE 802.11 despite these being based on CSMA. In particular, the inventors have realized support for an increasing variety of device classes, features, and services, as is expected to be required for IEEE 802.11, can be improved by introducing an Orthogonal Frequency Division Multiple Access (OFDMA) access scheme. Indeed, OFDMA may provide many advantages including solutions to unbalanced link budgets, improved spectral efficiency/higher capacity through more optimal resource scheduling, dynamic adaptive bandwidth which enables spectrum allocation to be adapted to the individual traffic need etc.

However, CSMA and OFDMA schemes tend to be incompatible as they have very different approaches for managing the access and resource distribution. Indeed, CSMA is based on a distributed approach where each remote station individually and autonomously decides whether to use the air interface channel to access the access point whereas OFDMA is based on a centralized resource allocation with a centralized resource manager determining which remote station is allowed to use the channel to access the access point.

Accordingly, the current Medium Access Control (MAC) functionality of IEEE 802.11 is very different than what is required for OFDMA as it is based on the CSMA scheme. Specifically, in CSMA, a remote station wanting to transmit first has to win access to the channel and following a contention period, it is then the only remote station transmitting, e.g. simultaneous transmissions of different users are not supported.

However, the inventors have realized that CSMA and OFDMA can be efficiently combined in systems such as IEEE 802.11 by using a power saving technique that has been introduced to conventional IEEE 802.11 systems. Specifically, an IEEE 802.11 system may implement a Power Save Multi-Poll (PSMP) scheme which allows remote stations to power down except in dedicated time intervals in which they are instructed by the base station to use for uplink traffic or in which they should expect downlink traffic.

PSMP is further described in e.g. the IEEE specification P802.11n/D5.0.

In PSMP, the access point may at any given point transmit a PSMP message which instructs all users that the CSMA scheme is temporarily suspended for a given time interval in which a Time Division Multiple Access (TDMA) approach will be used. The PSMP message furthermore provides a downlink and an uplink period for each remote station within the time interval. If there is a need for additional resource allocation following the expiry of the time interval, at least one more PSMP message may be transmitted extending the PSMP operation into a second time interval in which new uplink and downlink time intervals may be allocated. The power consumption of the individual remote stations is then reduced by the remote stations powering down after receiving the PSMP message and only powering up during the allocated time slots and at the termination of the temporary PSMP mode.

The inventors have realized that by introducing OFDMA in combination with PSMP which is conventionally used as a power reduction mechanism, an efficient combination of the different access schemes can be achieved allowing the system to adapt and be optimized for the specific experienced conditions. Thus, in the system of FIG. 1 an advanced system using a combination of very different multiple access schemes is used to optimize performance and adapt to the specific experienced conditions and preferences. The system may in particular provide the conventional advantages of CSMA in an IEEE 802.11 system while also providing the benefits and possibilities of OFDMA and in particular introducing efficient support for multiple simultaneous connections within a single channel.

Thus, in the system of FIG. 1 the OFDM communication channel is split into several subchannels comprising a set of OFDM subcarriers. The subchannels/subcarrier sets may then be allocated to different users for simultaneous communication. Specifically, the approach allows resource blocks to be allocated which are defined in terms of both a time interval and a group of OFDM subcarriers. Thus, the approach increases the performance and the flexibility of PSMP by introducing an additional degree of freedom when allocating resource.

Figure 2:
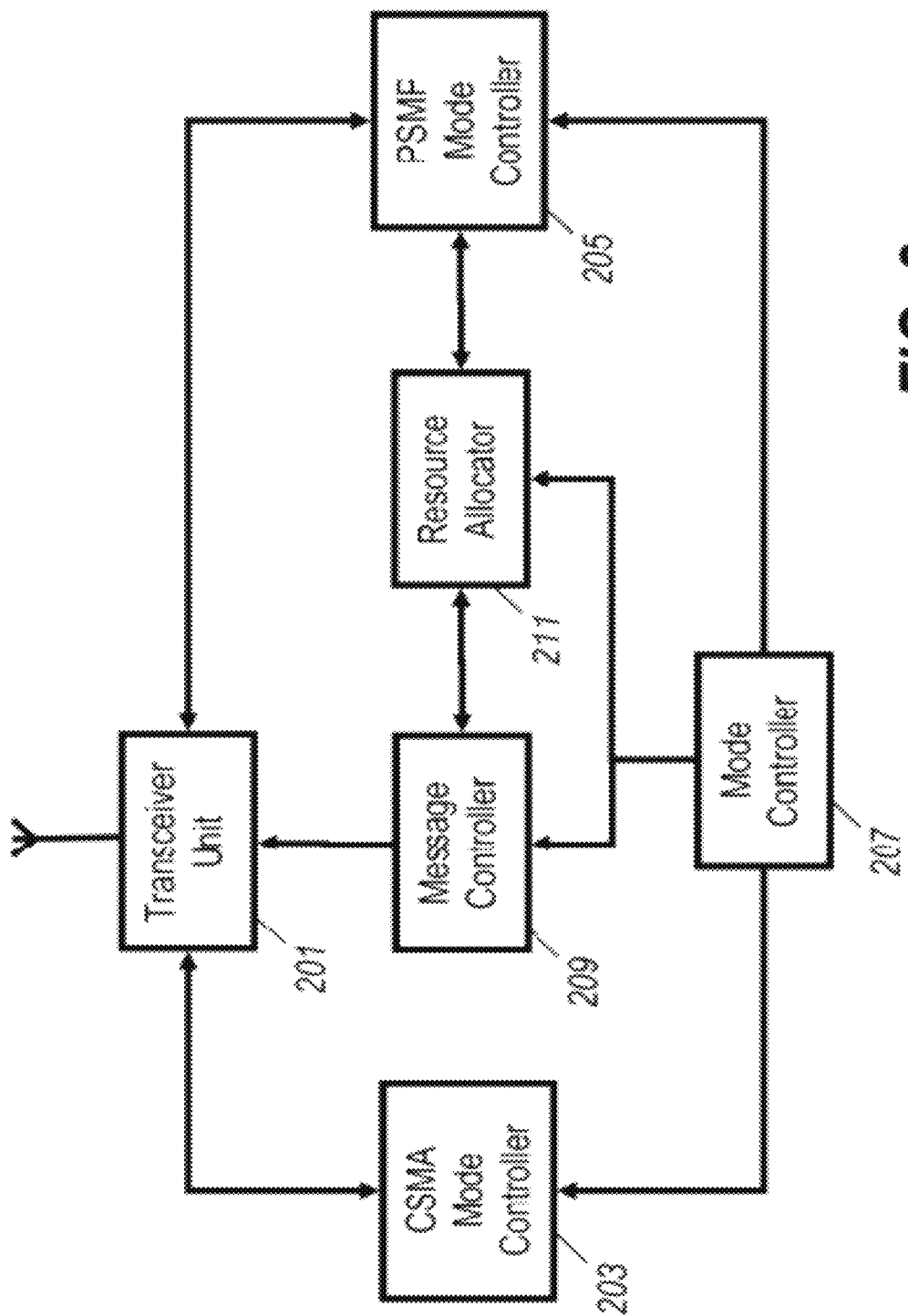
FIG. 2 is an illustration of some elements of an access point for a wireless local area network in accordance with some embodiments of the invention.

FIG. 2 illustrates elements of the access point 101. The access point 101 comprises a transceiver unit 201 which is arranged to communicate with remote stations 103 over the air interface of the IEEE 802.11 system. Thus, specifically the transceiver unit 201 can transmit downlink data to the remote stations 101 and receive uplink data from the remote stations using OFDM modulation.

The transceiver unit 201 is coupled to a CSMA mode controller 203 which is operable to control the operation of the access point 101 when this is operating in a first access mode wherein the access to the access point 101 is in accordance with the CSMA scheme used in a conventional IEEE 802.11 system. The transceiver unit 201 is also coupled to a PSMP mode controller 205 which is operable to control the operation of the access point 101 when this is operating in a second access mode wherein the access to the access point 101 is in accordance with a modified PSMP scheme. Thus, in this second access mode, the access to the IEEE 802.11 is controlled by use of a TDMA based scheme wherein time slots are centrally allocated to individual remote stations 103. Furthermore, in the system, an OFDMA approach is furthermore used when in the second access mode, such that access and resource allocation is controlled by a combined TDMA and OFDMA access scheme.

The CSMA mode controller 203 and PSMP mode controller 205 are further coupled to a mode controller 207 which controls whether the access point 101 is operating in the first or second access mode. Specifically, if the access point 101 determines that the current loading is very high or that there are a large number of remote stations 103 seeking to access the access point 101 (even if the combined resource demand of these remote stations is relatively low), it may temporarily switch the access point 101 from the first access mode to the second access mode.

When the access point 101 switches from the first access mode (the CSMA mode) to the second access mode (the OFDMA based modified PSMP mode), a first message is transmitted from the access point 101 to the remote stations 103 to inform them of the changed operation. Accordingly, the mode controller 207 is coupled to a message controller 209 which is further coupled to the transceiver unit 201. When the mode controller 209 switches the access point 101 from the first to the second access mode, it informs the message controller 209 which proceeds to generate the first message and feed this to the transceiver unit 201. The transceiver unit 201 then broadcasts the message such that it is received by all remote stations 103.

The access point 101 furthermore comprises a resource allocator 211 coupled to the mode controller 207, the PSMP mode controller 205 and the message controller 209. The resource allocator 211 is arranged to allocate resource to the remote stations when the access point 101 operates in the second access mode. The resource allocator 211 specifically allocates resource blocks to the remote stations 103 where each resource comprise at least one allocated time interval and an allocated set of OFDM subcarriers. In the specific example, each resource block (for communication with the access point 101) comprises both an uplink resource and a downlink resource but it will be appreciated that in other examples or embodiments, uplink and downlink resource may be allocated independently. Thus, in the example a resource block allocated to a specific remote station 103 is made up by an allocation of an uplink time interval in which the remote station may transmit uplink traffic to the access point 101 and a downlink time interval in which downlink traffic will be transmitted to the remote station from the access point 101. Furthermore, rather than allocating the entire OFDM channel to the remote station 103 for the time intervals, only a subset of the OFDM subcarriers of the OFDM symbols is allocated to the remote station (it will be appreciated that in some scenarios some of the resource blocks may allocate all subcarriers to one remote station in a particular uplink and/or downlink time interval).

For example, a set of one, two or more subcarriers may be allocated to the remote station 103. At the same time, other subcarriers may be allocated to other remote stations 103. Thus, in contrast to e.g. conventional PSMP, the time slots allocated by the resource allocator 211 may overlap with time slots allocated to other remote stations and thus a simultaneous communication is enabled for the remote stations.

Hence, in the system the resource allocator 211 may allocate resource blocks to different remote stations where the resource blocks have (fully or partially) overlapping time intervals. However, for such overlapping time interval resource blocks, the sets of OFDM subcarriers are disjoint such that no OFDM subcarrier is simultaneously allocated to two different remote stations.

In the example, the resource allocation for the time interval covered by the first message is performed at the time the resource allocator 211 switches to the second access mode. Accordingly, the generated resource allocation is included in the first message. Specifically, the first message will include an indication of each allocated resource block as well as an indication of which remote station it is allocated to.

Figure 3:
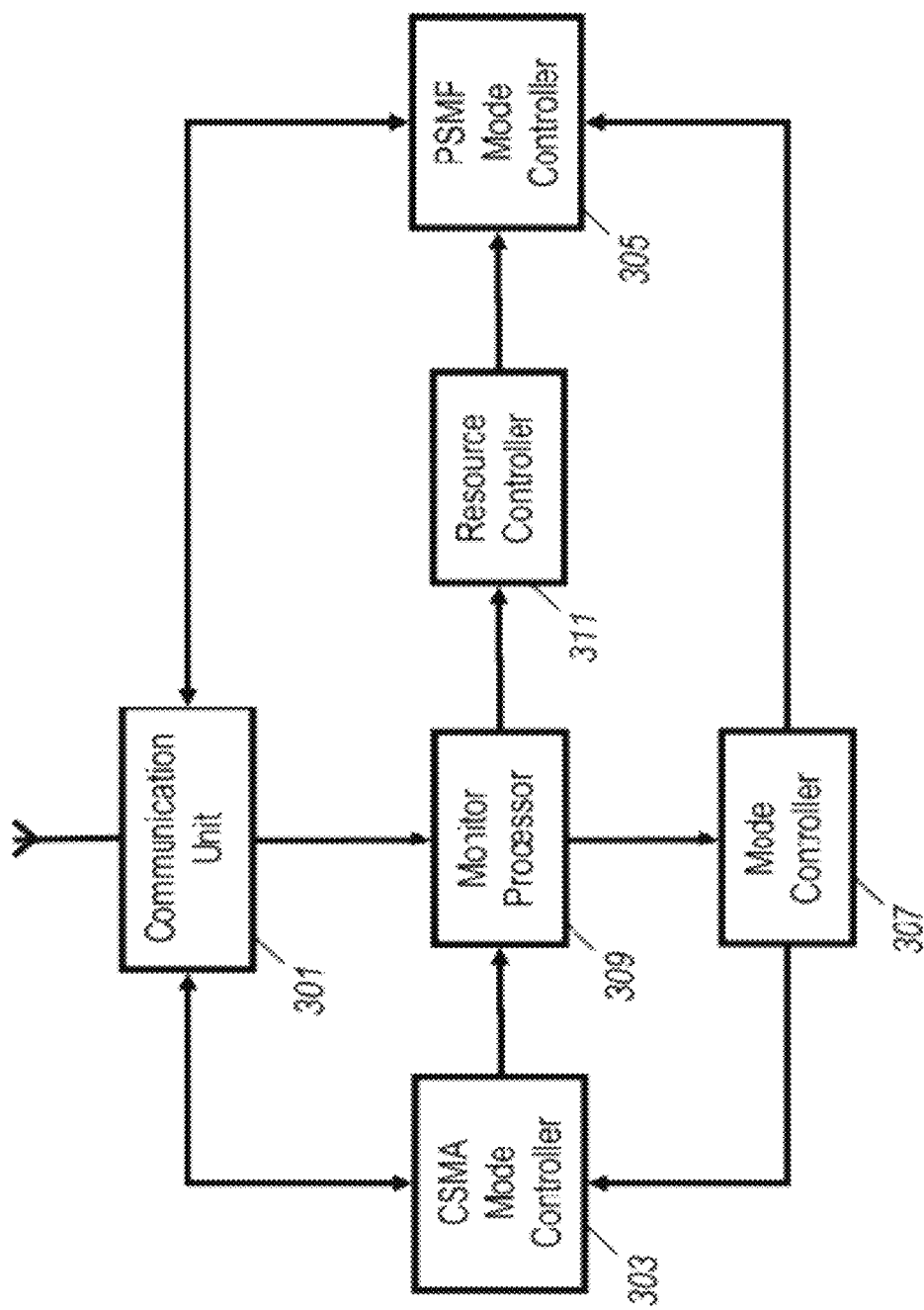
FIG. 3 is an illustration of some elements of a remote station for a wireless local area network in accordance with some embodiments of the invention.

FIG. 3 illustrates an example of elements of one of the remote stations 103 of FIG. 1. The remote station 103 comprises a communication unit 301 which is arranged to communicate with the access point 101 (or potentially with other remote stations 103) over the air interface of the IEEE 802.11 system. Thus, specifically the communication unit 301 can transmit uplink data to the access point 101 and receive downlink data from the access point 101 using OFDM modulation.

The communication unit 201 is coupled to a CSMA mode controller 303 which is operable to control the operation of the remote station 103 when the access point 101 is operating in the first access mode (i.e. when access to the access point 101 is in accordance with the CSMA scheme of conventional IEEE 802.11 systems). The communication unit 201 is also coupled to a PSMP mode controller 305 which is operable to control the operation of the remote station 103 when the access point 101 is operating in the second access mode (i.e. access to the access point 101 is in accordance with the modified PSMP scheme).

The CSMA mode controller 303 and PSMP mode controller 305 are further coupled to a mode controller 307 which controls whether the remote station 103 is operating in the CSMA or PSMP access mode. The mode controller 307 controls the operational mode dependent on information received from the access point 101 and specifically based on the information which is received in the first message from the access point 101.

Accordingly, the remote station 103 comprises a monitor processor 309 which is arranged to continuously monitor for the first message when the remote station 103 is in the CSMA mode. If the first message is detected, this is received and fed to the mode controller 307 which proceeds to switch the remote station 103 from the CSMA mode to the modified PSMP mode. Thus, whenever CSMA is used, the remote stations 103 all monitor to see if a message is transmitted from the access point 101 informing them that they should switch to the modified PSMP mode of operation.

The remote station 103 furthermore comprises a resource controller 311 coupled to the monitor processor 309 and arranged to receive the first message and to decode this to identify if any allocated resource blocks have been allocated to the remote station 103 by the resource allocator 211. The resource controller 311 is coupled to the PSMP mode controller 305 and is arranged to control this so that it operates in accordance with the allocated resource blocks. Specifically, it can control the PSMP mode controller 305 to only transmit to the access point 101 in the allocated uplink time slot and using the allocated set of OFDM subcarriers; as well as to receive transmissions from the access point 101 in the allocated downlink time interval and in (only) the allocated OFDM subcarriers.

In comparison to a conventional IEEE 802.11 system, the system of FIG. 1 has furthermore been amended to allow peer-to-peer (P2P) communication directly between two remote stations 103 without requiring the access point 101 to act as an intermediate access node. Furthermore, the inventors have realized that such P2P communications may efficiently be supported by implementing them as part of a modified PSMP scheme and specifically a modified PSMP scheme using OFDMA. Indeed, whereas P2P communications are not easily managed in the CSMA operation of IEEE 802.11, the inventors have realized that P2P communication can be supported by the described modified OFDMA PSMP approach while maintaining low complexity and efficient resource management and interworking with access point based communications.

In some scenarios, direct communication among two close remote stations 103 can be much more efficient and less resource demanding than a communication via the access point 101. Thus, in the system of FIG. 1, improved performance is achieved by allowing the resource allocator 211 to flexibly allocate the resource of the PSMP frame/time interval to different remote stations communicating simultaneously with the access point 101 as well as to allocate resource blocks for P2P communication directly between two remote stations 103. These P2P resource blocks may in some scenarios or embodiments be simultaneous with the access point based resource blocks or may in some scenarios or embodiments be restricted to time intervals dedicated to P2P communication.

Thus, in the example, the resource allocator 211 is also capable of allocating resource blocks for communication directly between two remote stations.

Figure 4:
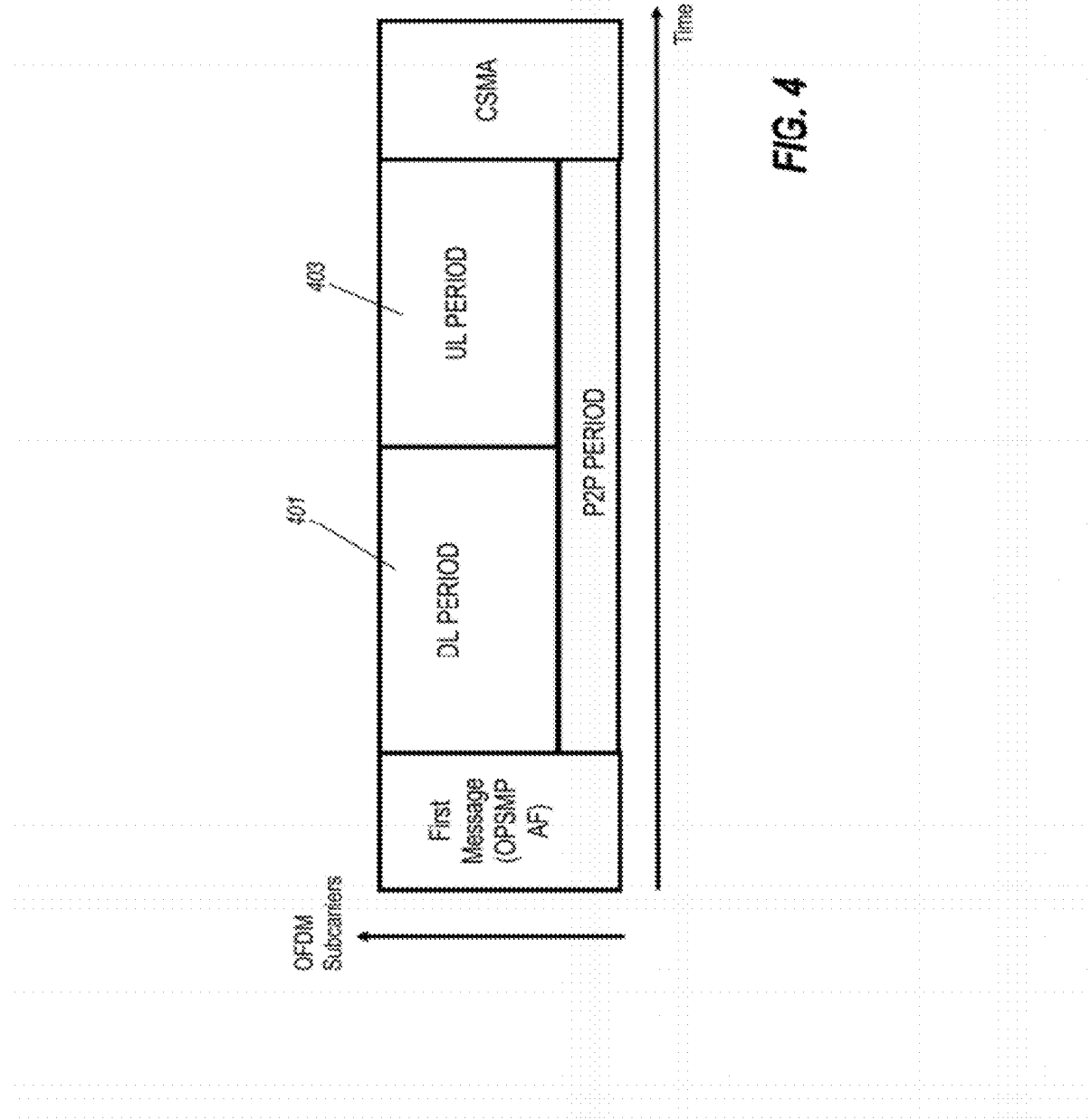
FIG. 4 is an illustration of an example of a resource distribution for a wireless local area network in accordance with some embodiments of the invention.

FIG. 4 illustrates an example of a frame structure that may be applied by the modified PSMP scheme (henceforth also referred to as OPSMP for OFDMA PSMP). As illustrated in the example, the OPSMP time interval or frame is initialized by the first message being transmitted (also referred to as an OPSMP Action Frame (AF)). When the first message is transmitted, this instantly starts the OPSMP time interval/frame.

In the specific example, the OPSMP is divided into an uplink time interval 401 and a downlink time interval 403 which are distinct and non-overlapping. In this example, the resource allocator 211 will allocate uplink resource blocks (i.e. resource for uplink communication) only in the uplink time interval 401 and downlink resource blocks (i.e. resource for downlink communication) only in the downlink time interval 403. This may substantially facilitate resource allocation and may provide a more efficient resource usage.

In the example, P2P resource blocks may furthermore be allocated in both the uplink time interval 401 and the downlink time interval 403. Thus, P2P resource blocks may be allocated with time intervals that are overlapping with uplink resource blocks and/or downlink resource blocks. However, the resource blocks are allocated such that the OFDM subcarriers are disjoint and thus such that no OFDM subcarriers are simultaneously allocated to P2P communication and uplink or downlink communication.

Following the end of the uplink time interval 401 and thus of the OPSMP time interval or frame, the remote stations 103 and the access point 101 automatically return to the conventional CSMA mode of operation (unless the first message indicates that the OPSMP access mode is extended for a second time interval or frame).

In the specific example of FIG. 4, the OFDM subcarriers are divided into two groups where the first group of subcarriers is used for uplink/downlink communication whereas the second group of subcarriers is used for P2P communication. Thus, a static resource allocation between access point based communication and P2P communication is used. However, it will be appreciated that in other embodiments, a more flexible allocation of subcarriers may be used.

It will also be appreciated that in some examples, the access point based communication and the P2P communication may be divided into three different and distinct time intervals. For example, the OPSMP time interval or frame may be divided into three different time intervals wherein one is used exclusively for uplink communication, one is used exclusively for downlink communication, and one is used exclusively for P2P communication. OFDMA may then be applied between different remote stations within each time interval. Thus, in such an example, no P2P resource block will have a time interval that overlaps a time interval of an uplink or downlink resource block. Such an approach may facilitate resource allocation and may in many examples reduce interference and resource usage. However, it may result in a suboptimal resource allocation in some scenarios.

In a conventional PMSP scheme, the allocation of time intervals for uplink and downlink communication is based on information transmitted from the remote stations to the access point in a message known as a TSPEC (Traffic SPECification) element. The TSPEC element or message is communicated in the ADDTS (ADD Traffic Stream) frame.

In the system of FIG. 1, the resource allocation for both uplink, downlink and P2P communications are based on transmission of a traffic specification message from the remote stations 103 to the access point 101. Thus, in the example, the PSMP mode controller 305 is arranged to transmit traffic specification messages which comprise data that specifies traffic requirement parameters for the remote station 103. The resource allocator 211 then allocates resource blocks depending on this information.

Figure 5:
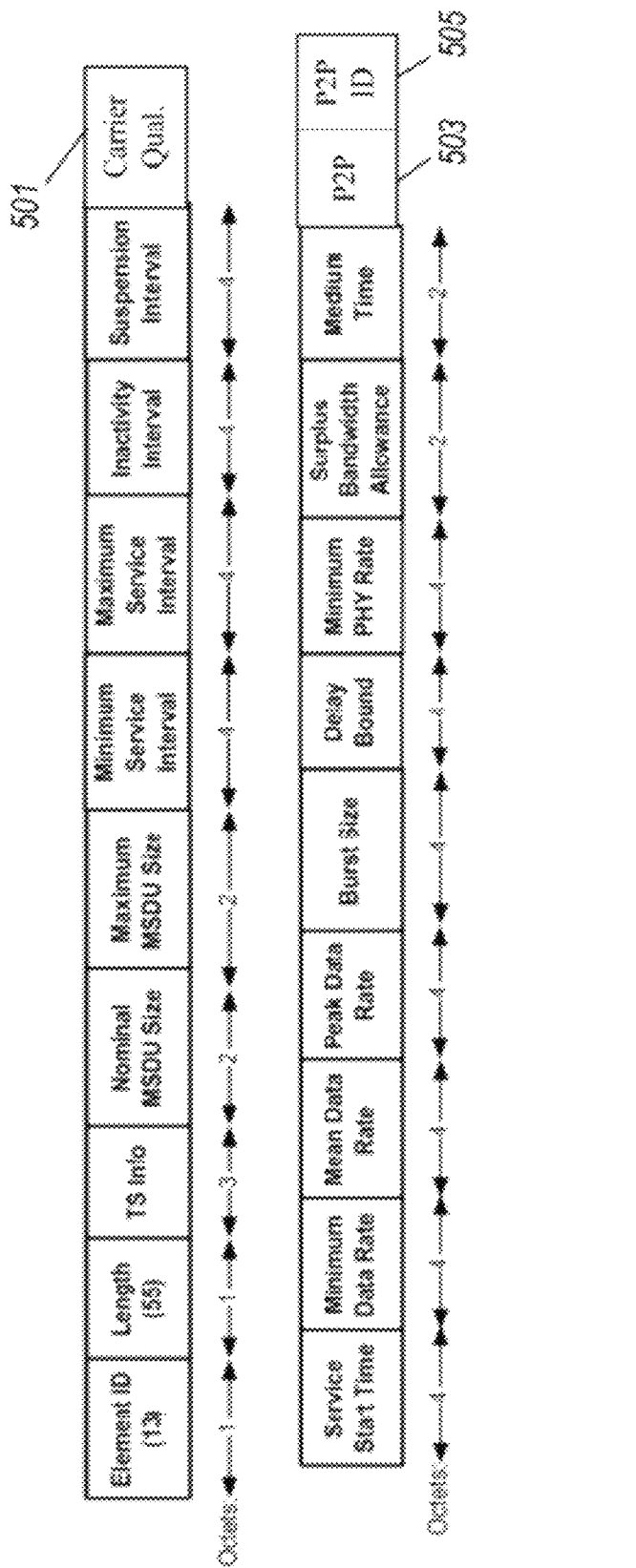
FIG. 5 is an illustration of an example of a traffic specification message for a wireless local area network in accordance with some embodiments of the invention.

In the specific example, the traffic specification message corresponds to a modified TSPEC message. An example of a modified TSPEC message is illustrated in FIG. 5. As illustrated, the modified TSPEC message comprises fields specifying a data rate, delay bounds, packet sizes etc as is known from a conventional TSPEC message.

However, in addition the modified TSPEC message comprises a field 501 which contains a subcarrier quality indication for the OFDM subcarriers. The quality indication comprises an indication of a perceived/measured quality for individual OFDM subcarriers. For example, the individual remote station 103 may monitor transmissions from the access point 101 and evaluate an individual signal to noise ratio for each individual OFDM subcarrier. The subcarrier quality indication may then report the measured signal indication. For example, for each OFDM subcarrier, the quality indication may report whether the subcarrier is considered to be "good", "medium" or "bad".

The resource allocator 211 is then arranged to perform the allocation of resource blocks in response to the subcarrier quality indications received from the remote stations 103. Specifically, it may attempt to allocate subcarriers to remote stations 103 such that a maximum number of OFDM subcarriers are allocated to remote stations 103 reporting that they are "good" subcarriers. This approach may substantially improve performance and reduce e.g. the required transmit power or the error rate of the air interface communications.

The modified TSPEC message furthermore comprises a field 503 which contains an indication that can correspond to a request to communicate directly with another remote station. For example, the data field may comprise a single bit which is set to a first value if the modified TSPEC message relates to an access point based resource and to a second value if the modified TSPEC message relates to a P2P resource. Thus, if the indication is set to the second value, the TSPEC will be used to allocate a P2P resource and otherwise it will be used to allocate access point resource. In addition, the modified TSPEC message comprises a field 505 which contains the identity of the other remote station for the P2P request. Thus, the resource allocator 211 can allocate the P2P resource taking into account both involved remote stations 103.

It will be appreciated that any suitable method or approach for the individual remote station 103 to detect and identify a suitable remote station 103 for P2P communication may be used. For example, a remote station 103 may be able to detect the presence of a suitable remote station 103 in its vicinity and assess the feasibility of a direct P2P link by listening to all transmissions (and storing the identity of the originating remote stations obtained e.g. from the sender ID field of the header of the different transmitted packets) or by sending dedicated probe packets.

Figure 6:
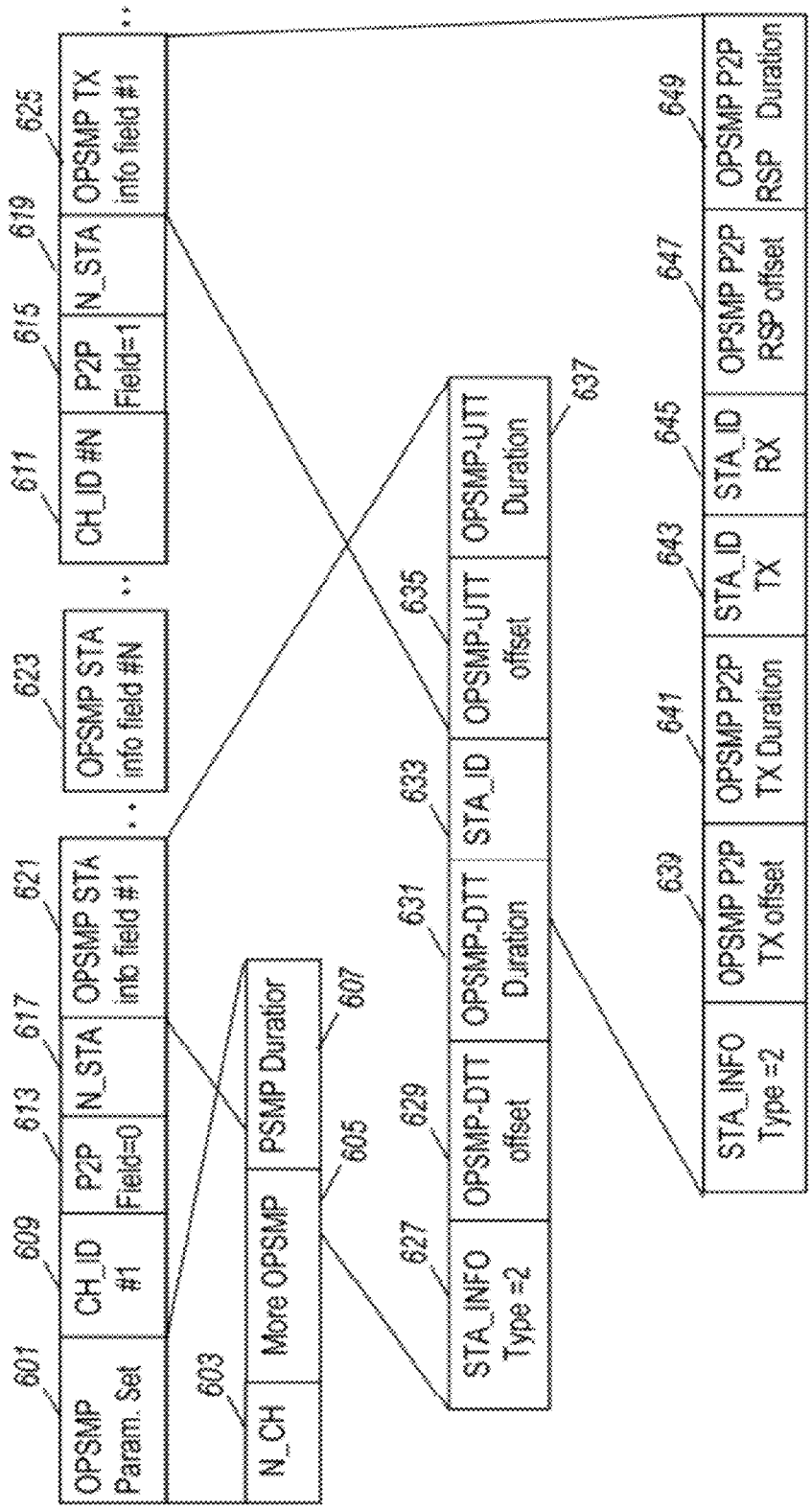
FIG. 6 is an illustration of an example of a resource allocation message for a wireless local area network in accordance with some embodiments of the invention.

In a conventional system, a PSMP time interval is initiated by the access point transmitting a PSMP message known as a PSMP Action frame (AF). In the system of FIG. 1, the OMPSP time interval is initiated by a modified PSMP AF henceforth referred to as an OPMSP AF. FIG. 6 illustrates an example of such an OPMSP AF.

The OPMSP AF comprises a first segment 601 which comprises an OPSMP Parameter Set used to define a number of parameters required for the operation in the OPMSP mode. Specifically, the first segment comprises a field 603 specifying a number of OFDM subcarrier channel sets that may be allocated in the OPSMP time interval.

Specifically, the total number of OFDM carriers may be divided into OFDM carrier sets that can be allocated separately from other OFDM subcarriers. Thus, in the system each subcarrier set may be freely allocated to remote stations 103 independently of how other OFDM subcarriers are allocated. However, all subcarriers within a set will be allocated together and thus an allocation of a subcarrier set in a time interval will correspond to an allocation of all subcarriers in that set for the time interval. Thus, each OFDM subcarrier set may be considered to correspond to an OFDM subcarrier channel and the field 603 specifies how many of these OFDM subcarrier channels are allocated within the OPMSP time interval.

It will be appreciated that in some embodiments, each set of OFDM subcarriers may comprise only a single subcarrier thereby providing a high resource allocation granularity allowing more flexible and efficient resource allocation.

However, in other embodiments, resource allocation complexity may be reduced by grouping pluralities of OFDM subcarriers in each set of OFDM subcarriers.

The first section 601 furthermore comprises a field 605 indicating whether the PSMP mode is terminated at the end of the time interval represented by the OPSMP AF or whether it will be continued thereafter (by transmission of a new OPMSP AF). This field 605 is followed by a field 607 which specifies the duration of the time interval covered by the OPMSP AF.

The OPMSP AF of FIG. 6 comprises a carrier set allocation section for each carrier set being included in at least one resource block that is allocated to a remote station in the time interval. Thus, the message is structured such that the resource allocation information is first arranged in accordance with the OFDM subcarrier sets which are ordered sequentially in the OPMSP AF. Specifically, a carrier set allocation section for an OFDM carrier set comprises a resource allocation indication for each resource block that includes this OFDM carrier set. The carrier set allocation section for the different OFDM carrier sets are sequentially included in the OPMSP AF. Thus, in the example of FIG. 6, the first section is followed by a number of carrier set allocation sections corresponding to the number of different subcarrier sets.

Each carrier allocation section is initiated by a field 609, 611, which identifies the OFDM subcarrier set that the carrier allocation section relates. For example, if each set comprises only a single OFDM subcarrier, the field 609, 611 can identify the subcarrier number.

In the example, each carrier set is either allocated to access point based communication or to P2P communication throughout the entire OPSMP time interval. Accordingly, fields 609 and 611 are followed by fields 613 and 615 respectively which comprise an identification of whether the carrier set is allocated to P2P communication or not. Thus, fields 613 and 615 comprise a communication type indication which indicates if the carrier set is allocated to communication directly between two remote stations 103 or to communication between a remote station 103 and the access point 101. The fields 613, 615 can be a simple binary value (e.g. equal to 0 for access point based communication and equal to 1 for P2P communication).

Fields 613, 615 are followed by fields 617, 619 which indicates how many different resource blocks have been allocated for the OFDM carrier set within the OPSMP time interval. An individual resource allocation indication is then provided for each resource block and thus fields 617, 619 indicate how many blocks should be expected before the next carrier allocation section begins.

Specifically, a resource block field 621, 623, 625 is included for each allocated resource block. Each of these fields 621, 623, 625 comprises a remote station identity for the remote station allocated the resource block and a time interval indication for the allocated time interval(s) of the resource block.

Specifically, a resource block field 621 for an access point based resource block is divided into a number of subfields. A first subfield 627 indicates the format of the remainder of the structure which is different for unicast, broadcast or multicast transmissions.

Subfield 627 is followed by subfield 629 which provides data identifying the start time of a time interval allocated to downlink communication from the access point 101 to the remote station 103. The start time is indicated as an offset time to the start of the OPSMP frame. Subfield 629 is followed by subfield 631 which provides data identifying the duration of the allocated time interval. Thus, the data of field 609, 629 and 631 defines a specific time-frequency block allocated for downlink communication from the access point 101.

Field 631 is followed by field 633 which includes the identity of the remote station 103 allocated the specific resource block.

In the system of FIG. 1, a combined resource is allocated to both uplink and downlink communication. Thus, whenever a downlink time interval is allocated, an uplink time interval is also allocated, and vice versa. Accordingly, the resource allocation of the OPMSP AF comprises combined uplink and downlink resource blocks. Specifically, field 621 furthermore comprises a field 635 defining a start of a time interval for an uplink communication from the remote station 103 to the access point 101. Furthermore, this field 635 is followed by a field defining the duration of the uplink interval.

The subfields of a resource block field 625 for a P2P OFDM carrier set/resource block is similar to that for a non-P2P OFDM carrier set/resource block. However, rather than identifying only a single remote station 103, subfields are included to define the identity for both involved remote stations. Furthermore, the defined time intervals are not uplink or downlink time intervals but are rather for communication in the two directions between the two remote stations.

Specifically, the field 625 comprises a subfield 639 which identifies the start time for a communication from a first remote station of the remote stations 103 to the second remote station (the first remote station may be defined as the remote station requesting the resource in the modified TSPEC message). Subfield 639 is then followed by subfield 641 which defines the duration of this time interval. This is followed by subfields 643 and 645 which define the identity of the first and second remote stations 103 respectively. Finally, subfields 647 and 649 are provided to define the start time and the duration of a time interval for transmitting from the second remote station to the first remote station.

Thus, in the example, the field defining the resource allocation for a P2P communication includes a remote station identity for each of the two involved remote stations as well as both an allocated time interval for a transmission in the direction from one remote station to the other as well as for transmission in the other direction.

Thus, in the system each remote station 103 detecting an OPMSP AF will decode this completely and scan the contained information to determine if any resource has been allocated to it (whether for uplink, downlink or P2P communication). It will then proceed to communicate using only the allocated resource blocks and may power down outside the allocated time intervals.

Figure 7:
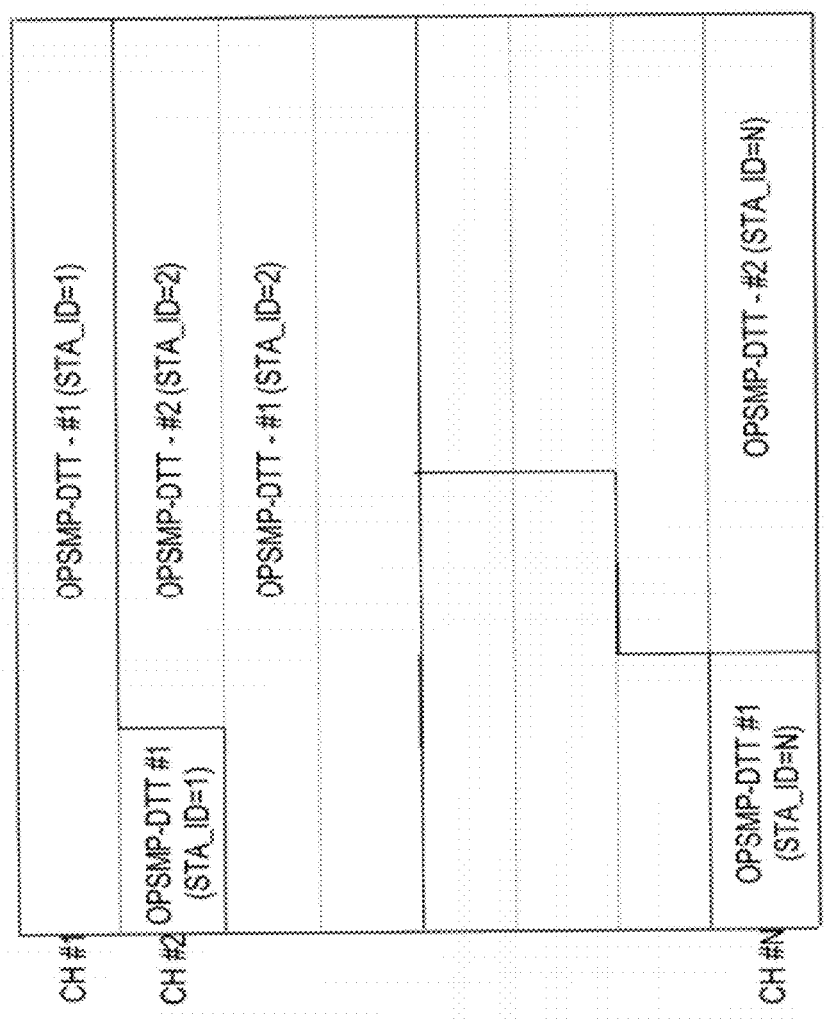
FIG. 7 is an illustration of an example of a resource distribution for a wireless local area network in accordance with some embodiments of the invention.

An example, of an OPSMP downlink communication is shown in FIG. 7.

In the system, in order to avoid problems related to the Automatic gain control (AGC), the resource allocator 311 may seek to align start times of time intervals for the resource blocks that are allocated for uplink communication from remote stations 103 to the access point 101.

It will be appreciated that the above description for clarity has described embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units.

As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims does not imply any specific order in which the features must be worked and in particular the order of individual steps in a method claim does not imply that the steps must be performed in this order. Rather, the steps may be performed in any suitable order.

The invention claimed is:

1. A wireless local area network operating using Orthogonal Frequency Division Multiplex, OFDM, the network comprising;
   an access point, wherein the access point operates in a first access mode wherein access to the access point is in accordance with a Carrier Sense Multiple Access, CSMA, scheme and in a second access mode wherein access to the access point is in accordance with a Time Division Multiple Access, TDMA, scheme; and wherein the access point includes:
      a resource allocator for allocating resource blocks when the access point operates in the second access mode, a resource block comprising an allocated time interval and an allocated set of OFDM subcarriers;
      a mode controller for temporarily switching the access point from the first access mode to the second access mode of operation for a time interval in response to determining whether a number of remote stations of a plurality of remote stations attempting to access the access point in the plurality of remote stations exceeds a threshold; and
      a transmit unit for broadcasting at least a first message to each remote station of the plurality of remote stations indicating that the access point switches from the first access mode to the second access mode for the time interval; the first message comprising resource information specifying resource blocks allocated to the plurality of remote stations; and
   wherein each of the remote stations from the plurality of remote stations operates in a CSMA mode of operation the remote station is arranged to autonomously access the access point if no collision is detected and to operate in a TDMA mode of operation wherein the remote station is arranged to communicate only using resource allocated to the remote station by the resource allocator; and wherein each remote station includes:
      a monitor processor for monitoring for the first message,
      mode switch means for switching the remote station from the CSMA mode to the TDMA mode for at least the time interval in response to a detection of the first message,
      a resource controller for decoding the first message to identify an allocated resource block being allocated to the remote station by the resource allocator, and
      a communication unit for communicating with the access point using a set of allocated time intervals and a set of allocated OFDM subcarriers of the allocated resource block;
   wherein the resource allocator is arranged to allocate resource blocks having overlapping time intervals and disjoint sets of OFDM subcarriers to a plurality of remote stations allowing simultaneous communication for the plurality of remote stations within the overlapping time interval.

2. The wireless local area network of claim 1 wherein the resource allocator is further arranged to allocate resource blocks for communication directly between two remote stations from the plurality of remote stations.

3. The wireless local area network of claim 2 wherein the resource allocator is arranged to allocate at least a first resource block for communication directly between the two remote stations having an overlapping time interval and disjoint sets of OFDM subcarriers with a second resource block for communication between the access point and a remote station from the plurality of remote stations.

4. The wireless local area network of claim 2 wherein the resource allocator is arranged to allocate at least a first resource block for communication directly between the two remote stations having a time interval which overlaps a time interval of at least one resource block allocated for communication between the access point and a remote station from the plurality of remote stations.

5. The wireless local area network of claim 2 wherein the resource allocator is arranged to allocate resource blocks for communication directly between the two remote stations in a time interval which does not overlap any time interval of resource blocks allocated for communication between the access point and a remote station from the plurality of remote stations.

6. The wireless local area network of claim 2 wherein each of the remote stations further comprises:
   a traffic processor arranged to generate a traffic specification message comprising data specifying traffic requirement parameters for the remote station and a direct communication indication indicative of a request to communicate directly with another remote station; and wherein the communication unit is arranged to transmit the traffic specification message to the access point and the resource allocator is arranged to allocate resource blocks for direct communication in response to the direct communication indication.

7. The wireless local area network of claim 6 wherein the traffic specification message further comprises an identity of the another remote station.

8. The wireless local area network of claim 1 wherein the resource allocator is arranged to divide the time interval into at least an uplink time interval and a downlink time interval, the uplink time interval and the down-link time interval being non-overlapping; and to allocate resource blocks for uplink communication from remote stations to the access point only in the uplink time interval and to allocate resource blocks for downlink communication from the access point to remote stations only in the downlink link time interval.

9. The wireless local area network of claim 2 wherein each of the remote stations further comprises:

a traffic processor arranged to generate a traffic specification message comprising data specifying traffic requirement parameters for the remote station and a subcarrier quality indication for OFDM subcarriers; and wherein the communication unit is arranged to transmit the traffic specification message to the access point and the resource allocator is arranged to allocate resource blocks in response to the subcarrier quality indication.

10. The wireless local area network of claim 1 wherein the OFDM subcarriers are divided into OFDM subcarrier sets, each resource block comprising an allocation of at least one OFDM subcarrier set; and the first message comprises a subcarrier set allocation section for each OFDM subcarrier set being included in at least one resource block allocated to a remote station; and the subcarrier set allocation section for a first OFDM subcarrier set comprises a resource allocation indication for each allocated resource block that includes the first OFDM subcarrier set, the resource allocation indication comprising a remote station identity for the remote station allocated the resource block and a time interval indication for the allocated time interval of the resource block.

11. The wireless local area network of claim 10 wherein the resource allocation comprises an indication of both an allocated time interval for an uplink communication and an allocated time interval for a downlink communication.

12. The wireless local area network of claim 10 wherein the resource allocator is further arranged to allocate resource blocks for communication directly between the two remote stations and each subcarrier set allocation section comprises an communication type indication indicating whether the OFDM subcarrier set is allocated to communication directly between two remote stations or to communication between a remote station and the access point.

13. The wireless local area network of claim 12 wherein each resource allocation indication for an OFDM subcarrier set allocated to communication directly between the two remote stations comprises a remote station identity for each of the two remote stations.

14. The wireless local area network of claim 12 wherein each resource allocation indication for an OFDM subcarrier set allocated to communication directly between the two remote stations comprises an indication of an allocated time interval for a transmission from a first remote station of the two remote stations to a second remote station of the two remote stations, and an indication of an allocated time interval for a transmission from the second remote station to the first remote station.

15. The wireless local area network of claim 10 wherein at least one OFDM subcarrier set contains only a single OFDM subcarrier.

16. The wireless local area network of claim 1 wherein the resource allocator is arranged to align start times of time intervals for at least some resource blocks for uplink communication from remote stations to the access point.

17. The wireless local area network of claim 8 wherein the resource allocator is further arranged to allocate resource blocks for communication directly between two remote stations in both the uplink time interval and the downlink time interval.

18. The wireless local area network of claim 1 wherein the access point is arranged to operate a Power Save Multi-Poll, PSMP, scheme when the access point is in the second access mode and the remote stations are arranged to operate the PSMP scheme when the remote stations are in the TDMA mode, wherein the remote stations access the access point in the second mode in accordance with a TDMA scheme.

19. The wireless local area network of claim 1 wherein the wireless local area network is an IEEE802.11 local area network.

20. A method of operation for a wireless local area network operating using Orthogonal Frequency Division Multiplex, OFDM, the wireless local area network including an access point and a plurality of remote stations and wherein the access point operating in a first access mode wherein access to the access point and is in accordance with a Carrier Sense Multiple Access, CSMA, scheme and in a second access mode wherein access to the access point in accordance with a Time Division Multiple Access, TDMA, scheme and wherein each of the remote stations operates in a CSMA mode wherein each of the remote stations autonomously accesses the access point if no collision is detected and to operate in a TDMA mode wherein each of the remote station s communicate only using resources allocated to the remote station by the access point, the method comprising the steps of:

allocating, by a resource allocator in the access point, resource blocks to the remote stations when the access point operates in the second access mode, a resource block for a remote station comprising an allocated time interval and an allocated set of OFDM subcarriers, temporarily switching the access point, by a mode controller in the access point, from the first access mode to the second access mode of operation for a time interval in response to determining whether the number of remote stations attempting to access the access point of the plurality of remote stations exceeds a threshold, broadcasting, by a transmit unit in the access point to each remote station of the plurality of remote stations, at least a first message indicating that the access point switches from the first access mode to the second access mode, the first message comprising a resource information specifying resource blocks allocated to the plurality of remote stations;

monitoring, by the plurality of remote stations, for the first message, switching each remote station from the CSMA mode to the TDMA mode in response to a detection of the first message, decoding, by the plurality of remote stations, the first message to identify an allocated resource block being allocated to the remote station by the resource allocator, and communicating with the access point using a set of allocated time intervals and a set of allocated OFDM subcarriers of the allocated resource block;

wherein the allocation of resource blocks includes allocating resource blocks having overlapping time intervals and disjoint sets of OFDM subcarriers to a plurality of remote stations allowing simultaneous communication for the plurality of remote stations within the overlapping time interval.

* * * * *